| United States Patent [19] | [11] | 4,110,277 |
|---|---|---|
| Economy et al. | [45] | Aug. 29, 1978 |

[54] NYLON MODIFIED PHENOLIC RESIN FIBERS

[75] Inventors: James Economy, Eggertsville; Francis J. Frechette, Tonawanda; Luis C. Wohrer, Lewiston, all of N.Y.

[73] Assignee: The Carborundum Company, Niagara Falls, N.Y.

[21] Appl. No.: 767,005

[22] Filed: Feb. 9, 1977

Related U.S. Application Data

[63] Continuation of Ser. No. 149,046, Jun. 1, 1971, abandoned.

[51] Int. Cl.² .................... C08L 61/10; C08L 77/10; C08L 77/04
[52] U.S. Cl. ............................ 260/841; 57/140 R; 264/176 F; 428/364
[58] Field of Search ............... 260/841; 264/176 F; 57/140 R; 428/364

[56] References Cited

U.S. PATENT DOCUMENTS

| 2,378,667 | 6/1945 | Vaala | 260/841 |
|---|---|---|---|
| 2,412,054 | 12/1946 | McClellan | 260/841 |
| 2,484,523 | 10/1949 | McClellan | 260/841 |
| 2,660,546 | 11/1953 | McCarthy | 260/841 |
| 3,259,670 | 7/1966 | Weltman et al. | 260/841 |
| 3,363,025 | 1/1968 | Fitko et al. | 260/841 |
| 3,634,307 | 1/1972 | Morton | 260/841 |
| 3,639,953 | 2/1972 | Kimura et al. | 264/176 |
| 3,650,102 | 3/1972 | Economy et al. | 264/176 |

*Primary Examiner*—John C. Bleutge
*Attorney, Agent, or Firm*—David E. Dougherty; Raymond W. Green

[57] ABSTRACT

Phenolic resins employed for melt spinning fibers are modified by the incorporation therein of from about 5% to about 30% of an aliphatic nylon, whereby the melt spinning characteristics of the phenolic resins are improved and the tenacity of the melt spun fibers is increased.

18 Claims, No Drawings

NYLON MODIFIED PHENOLIC RESIN FIBERS

This is a continuation of copending application Ser. No. 149,046, filed June 1, 1971, now abandoned.

The present invention relates to the use of aliphatic nylons as modifiers for phenolic resins employed for melt spinning phenolic resin fibers to improve the melt spinning characteristics of the phenolic resins and to increase the tenacity of the resulting phenolic resin fibers.

Phenolic resins are too well-known in the art to require more than a very brief description here. Extensive discussions of phenolic resins may be found, for example, in A.A.K. Whitehouse et al, *Phenolic Resins*, American Elsevier Publ. Co., Inc., New York (1968), and Gould, *Phenolic Resins*, Reinhold Publ. Corp., New York (1959).

Phenolic resins are produced by the condensation of a phenol and an aldehyde. The phenol employed is most commonly phenol itself, but any of a wide variety of phenols as well as mixtures thereof may be used, such as phenol which is substituted in the ortho, meta, and/or para position, provided that sufficient ortho and para positions are unsubstituted to permit condensation and cross-linking. Similarly, various aldehydes have been employed, formaldehyde being by far the most commonly used. Accordingly, many different varieties of phenolic resins are commercially available.

Phenolic resins are generally classified as either resoles or novolacs. Resoles are ordinarily prepared by carrying out the condensation with a molar excess of the aldehyde and in the presence of an alkaline catalyst. Resoles are characterized by the presence therein of methylol groups, which render it possible to effect curing and cross-linking via methylene linkages by heat alone. Novolacs are usually prepared by employing an acid catalyst and a slight molar excess of the phenol. Novolacs are characterized by the absence of methylol groups and accordingly, they cannot be cured and cross-linked by heat alone, additionally requiring the presence of a source of methylene groups and preferably a suitable catalyst.

Infusible cured phenolic resin fibers are a comparatively recent development in the history of phenolic resins. They are ordinarily produced by fiberizing a melt of a phenolic resin, as by melt spinning or blowing, to obtain fusible uncured phenolic resin fibers which are subsequently treated to cure, or cross-link, the resin at least to the point of infusibility. When the phenolic resin selected is a resole, such curing is effected merely by heating. When the phenolic resin selected is a novolac, curing is effected by heating in the presence of a source of methylene groups such as hexamethylenetetramine, paraformaldehyde or formaldehyde, and preferably also in the presence of an acidic or basic catalyst, hexamethylenetetramine being rather unique in being able to serve as both a methylene group source and a basic catalyst. A particularly desirable method for the preparation of infusible cured novolac fibers is described in U.S. patent application Ser. No. 710,292, filed Mar. 4, 1968 by James Economy et al, now U.S. Pat. No. 3,650,102 which is commonly assigned with the present application and the disclosure of which is incorporated herein by reference. Fibers may also be prepared from mixtures of resoles and novolacs in any desired proportions, the curing conditions being selected with regard to the proportions.

Infusible cured phenolic resin fibers have a number of highly desirable properties which render them of value in numerous applications. Perhaps their most important virtue is their outstanding flame resistance. When subjected to a flame, the fibers, being infusible, do not melt, but rather char to produce carbon fibers which continue to retain the shape and approximate dimensions of the original fibers and which continue to afford extremely effective protection from flames. Accordingly, the fibers are of great utility in the fabrication of flame protective clothing, as well as drapes, carpeting, upholstery and the like which are especially suited to use in areas where fire constitutes a particular hazard. Such fibers also provide very effective thermal and acoustical insulation, and again they are particularly useful in these applications in areas where fire is a hazard. The fibers generally have suitable mechanical properties such as tenacity and break elongation to permit their being processed into yarns, woven and knitted fabrics and the like, as well as various nonwoven forms such as felt, batting and paper. The textile processing techniques employed to produce these various products will depend, of course, upon the form of the fibers to be processed, such as staple, continuous filaments or continuous multifilament yarns, which in turn depends upon the method used to fiberize the phenolic resin.

The selected phenolic resin may be fiberized by blowing, which comprises melting the resin and allowing a thin stream of the melt to fall into the path of a blast of a gas such as air which fiberizes the stream, the resulting fibers rapidly cooling and solidifying, whereby there is produced a staple consisting of a multiplicity of fusible uncured phenolic resin fibers of rather variable length and diameter. However, in view of the rather complicated textile processing which is required to convert such staple fiber into certain types of useful forms such as fabrics, it is generally much preferred to employ melt spinning as a means of fiberizing the phenolic resin, whereby single continuous filaments or preferably continuous multifilament yarns may be obtained which usually lend themselves more readily to further textile processing into the ultimately desired form. Most simply, a continuous filament is drawn downwardly from an orifice in the bottom of a vessel containing the molten phenolic resin, the filament being wound up and collected on a revolving take-up spool mounted below the orifice, the take-up spool also serving to attenuate the filament as it is drawn from the orifice before it cools and solidifies upon contacting the atmosphere between the orifice and the spool. Preferably, however, a plurality of such filaments are drawn simultaneously from a plurality of orifices as in a bushing or a spinnerette. In such a case, it is customary to employ a suitable device to gather the solidified filaments together into a continuous multifilament yarn before they are wound up on the take-up spool, and also to employ a traversing mechanism or guide to distribute the continuous and multifilament yarn uniformly across the length of the take-up spool.

However, the production of uncured phenolic resin fibers in the form of continuous filaments and continuous multifilament yarns by melt spinning is beset by certain difficulties. Frequent breakage of the filaments before they have completely solidified is encountered especially at the orifice or slightly below it, as a result of the melt spinning characteristics of phenolic resins. In due course, the broken filament is replaced, since the molten resin drips down from the orifice to form a new filament, the end of which ultimately reaches and is caught up on the take-up spool, but until attenuation thereby begins, the newly formed filament is considerably thicker in diameter. Also, fusible uncured phenolic resin fibers generally possess a relatively low tenacity, and accordingly, considerable filament breakage occurs as the solidified filaments pass through the gathering device and the traversing mechanism and as they are being wound up on the take-up spool. Another complication is introduced by the fact that the free ends of broken filaments on the spool tend to become entangled with other filaments, thereby rendering it difficult or impossible to unwind the yarn from the spool. In view of these various problems caused by filament breakage, it has proven quite difficult to produce phenolic resin fibers in the form of continuous filaments and continuous multifilament yarns, especially wherein the filaments have a relatively uniform diameter.

A wide variety of materials have been tried as modifiers for phenolic resins in an attempt to improve the melt spinning characteristics thereof and to increase the tenacity of fibers produced therefrom, but heretofore, none of these materials has proven to be effective. In accordance with the present invention, however, it has been found that the aliphatic nylons are especially effective modifiers for phenolic resins from both standpoints. The aliphatic nylons markedly improve the melt spinning characteristics of phenolic resins, and thus drastically reduce breakage of the unsolidified filaments, which also results in a reduced incidence of new filament formation and a corresponding improvement in uniformity of diameter. The aliphatic nylons also result in an increase in the tenacity of the uncured phenolic resin fibers, thus reducing breakage of the solidified fibers at the various points of mechanical stress during the melt spinning operation. Accordingly, the incorporation of a suitable proportion of an aliphatic nylon in phenolic resins to be used for melt spinning greatly facilitates the production of continuous filaments and continuous multifilament yarns of relatively uniform diameter filaments.

The term "nylon" has come to be understood as referring to a linear, fiber-forming synthetic resin of the class known as polyamides, and the term is so used herein. Fiber-forming polyamides are sometimes referred to as superpolyamides. Polyamides generally and nylons specifically are too well-known in the art to require an extensive description here. Their preparation, properties, etc., are fully treated in such works as D. E. Floyd, *Polyamide Resins*, Reinhold Publ. Corp., New York (1958). Polyamides are synthetic polymeric condensation products which contain recurring amide groups in the polymer chain. Linear polyamides, i.e., those in which the polymer chains are not branched, and generally produced either by autocondensation of a monoaminomonocarboxylic acid or a derivative thereof, or by co-condensation of a diamine and a dicarboxylic acid or derivatives thereof. Nylons, in addition to being linear polyamides, are characterized by having a sufficiently high molecular weight as to be capable of being drawn into fibers. Aliphatic nylons are those produced from aliphatic monomers, and they accordingly contain no aromatic or unsaturated structural units in the polymer chain.

A conventional system of nomenclature is commonly used to designate specific aliphatic nylons. Aliphatic nylons produced by autocondensation of a single aliphatic amino acid monomer or derivative thereof are designated by a single number which signifies the number of carbon atoms in the monomer. Thus, nylon-6 designates poly($\epsilon$-caprolactam), produced by autocondensation of $\epsilon$-aminocaproic acid or its lactam; nylon-11 designates poly($\omega$-undecaneamide), produced by autocondensation of 11-aminoundecanoic acid; and nylon-12 designates poly ($\omega$-dodecaneamide), produced by autocondensation of 12-aminododecanoic acid or dodecanolactam. Aliphatic nylons produced by co-condensation of an aliphatic diamine and an aliphatic dicarboxylic acid or derivatives thereof are designated by two numbers, the first of which indicates the number of carbon atoms separating the nitrogen atoms of the diamine, and the second indicating the number of straight-chain carbon atoms in the dicarboxylic acid. Thus, nylon-6,6 designates poly(hexamethyleneadipamide), produced by co-condensation of hexamethylenediamine and adipic acid; nylon-6,10 designates poly(hexamethylenesebacamide), produced by co-condensation of hexamethylenediamine and sebacic acid; and nylon-6,12 designates poly(hexamethylenedodecanoamide), produced by co-condensation of hexamethylenediamine and dodecanoic acid. In addition to the foregoing commercially available aliphatic nylons, examples of other aliphatic nylons which are useful in practicing the invention include among others, those numbered as follows, most or all of which are also commercially available: 7; 8; 9; 10; 4,4; 6,4; 6,7; 6,8; 6,9; 8,10; 8,12; 10,10; and 10,12.

In accordance with the invention, the melt spinning characteristics of a phenolic resin are improved by incorporating therein from about 5% to about 30% and preferably about 10% of an aliphatic nylon, these percentages being by weight based upon the combined weight of the phenolic resin and aliphatic nylon. The nylon may be incorporated in the phenolic resin by any convenient technique, such as dissolving the nylon in a melt of the resin, or by dissolving the phenolic resin and nylon in a mutual solvent and thereafter removing the solvent. Most conveniently, a melt spinning solution is prepared directly by melting the phenolic resin and dissolving the aliphatic nylon therein. Since no reaction occurs between the nylon and the phenolic resin, fibers produced from such a nylon modified phenolic resin consist essentially of the uncured phenolic resin and from about 5% to about 30% of the aliphatic nylon. Such fibers exhibit a tenacity considerably higher than fibers produced from the phenolic resin alone.

At least about 5% of the aliphatic nylon is required to achieve a significant improvement in the melt spinning characteristics of the phenolic resin and the tenacity of the fibers produced therefrom. The tenacity of the uncured phenolic resin fibers tends to increase with increasing amounts of nylon, but the flame resistance of the ultimate infusible cured phenolic resin fibers tends to decrease with increasing nylon content, approximatly 30% nylon being the maximum amount which does not seriously impair this property. About 10% nylon appears to be the optimum amount, since this amount does not substantially diminish the flame resistance of the ultimate cured phenolic resin fibers, but affords an increase in the tenacity of the uncured fibers of the order of 50% and imparts virtually maximum improvement to the melt spinning characteristics of the phenolic resin.

If desired, the nylon modified phenolic resins of the invention may be fiberized by blowing rather than by melt spinning, although there is no particular advantage to using the modifier in this case. In any event, the nylon modified uncured phenolic resin fibers may be cured as usual, the nylon having no significant effect upon the curability of the phenolic resin.

The invention will now be described partly with reference to the following examples, which are intended to illustrate, and not to limit the scope of, the invention.

EXAMPLE 1 — CONTROL

A novolac is prepared conventionally by condensing formaldehyde with a slight molar excess of phenol in the presence of a catalytic amount of oxalic acid. After purification to remove any particulate impurities and residual phenol, the resin has a number average molecular weight of about 700. The resin is fiberized, i.e., formed into fibers, by melt spinning, 38 filaments being simultaneously drawn from a melt of 127° C through a spinnerette having 38 circular orifices 0.25 mm. in diameter and 0.5 mm. long, at a rate of 615 meters per minute. The melt temperature employed is the optimum temperature with respect to minimum filament breakage. As the filaments are drawn and after they have solidified, they pass through a gathering device which assembles them into a 38-strand continuous miltifilament yarn and thence through a traversing mechanism which distributes the yarn evenly over the surface of a revolving take-up spool. The melt spinning is continued until approximatey 30 grams of fibers have been collected on the spool, and during this period, the average frequency of filament breakage at and just below the orifices is observed to be 10 breaks per minute; i.e., one of the 38 filaments breaks on the average of every 6 seconds. The resulting uncured phenolic resin fibers have an average tenacity of 0.3 grams per denier.

Curing of the phenolic resin in effected as follows. The fibers on the spool are immersed in two liters of an aqueous solution containing 18% paraformaldehyde as a source of methylene groups and 18% HCl as a catalyst, at room temperature (about 25° C). The solution is heated to 40° C over a period of 2 hours, then to the boiling point (103° C) over a period of 1.5 hours, and the temperature is held at the boiling point for 2 hours, whereupon the fibers are removed, washed with water, and dried in air at about 60° C. The resulting infusible cured phenolic resin fibers have an average tenacity of 1.7 grams per denier and an average break elongation of 41%.

EXAMPLES 2 – 10

A series of comparative melt spinning runs is carried out as summarized in Table I employing the same phenolic resin as used in Example 1 but having an aliphatic nylon incorporated therein. the particular aliphatic nylon employed in each run is set forth in the second column of Table I, the amount of the nylon being set forth in the third column in terms of the percent of the total weight of phenolic resin and nylon. In each run, the nylon is incorporated in the phenolic resin by heating the latter to 180° C and dissolving the nylon in the resulting melt with the aid of occasional stirring. In each instance, melt spinning is carried out as in Example 1, with the same apparatus and at the same drawing speed. However, since the nylon modifier increases the viscosity of the phenolic resin melt at any given temperature, the optimum melt temperature for spinning with minimum filament breakage is somewhat higher than in the case of the unmodified phenolic resin, and each run is carried out at the optimum melt temperature as set forth in the fourth column of Table I. The average frequency of filament breakage during the melt spinning is reported in Table I, as are the average tenacities of the uncured phenolic resin fibers produced in some of the runs, together with the average tenacities and average break elongations of the fibers after curing exactly as in Example 1. The average diameter of the filaments in the yarns produced in Examples 1-10 is within the range from 13 to 17 microns.

TABLE I

| Example No. | Nylon | Amt. of Nylon (%) | Melt Temp. (° C) | Filament Breaks/ Minute | Uncured Resin Fibers Average Tenacity (g./den.) | Cured Resin Fibers | |
|---|---|---|---|---|---|---|---|
| | | | | | | Av. Tenacity (g./den.) | Av. Break Elongation (%) |
| 1 | CONTROL | | 127 | 10 | 0.3 | 1.7 | 41 |
| 2 | 6,10 | 5 | 129 | 2 | 0.4 | 1.8 | 45 |
| 3 | 6,10 | 10 | 143 | 0.1 | 0.5 | 1.9 | 37 |
| 4 | 6,10 | 20 | 156 | 0.1 | 0.7 | 1.7 | 35 |
| 5 | 11 | 10 | 143 | 0.1 | — | 1.8 | 38 |
| 6 | 6 | 10 | 138 | 0.1 | — | 1.7 | 34 |
| 7 | 6,6 | 10 | 141 | 0.5 | — | 1.7 | 20 |
| 8 | 6,12 | 10 | 148 | 0.1 | — | 1.9 | 39 |
| 9 | 12 | 10 | 138 | 0.2 | 0.5 | 1.6 | 31 |
| 10 | Mixture* | 10 | 151 | 0.1 | 0.5 | 1.5 | 17 |

*Mixture of nylon-6, nylon-6,6 and nylon-6,10 available from E. I. du Pont de Nemours & Co. under the trade name Elvamide 8061.

As may be seen from Table I, aliphatic nylons in amounts of 5% or more are extremely effective modifiers for phenolic resins to reduce the incidence of filament breakage during melt spinning thereof. Comparing Examples 1, 2, 3 and 4, it is seen that the average tenacity of the uncured phenolic resin fibers increases with increasing proportions of nylon, and that, while 5% nylon is sufficient to effect a marked decrease in the incidence of filament breakage, the preferred amount of about 10% is still more effective. However, from Examples 3 and 4, it may be seen that 20% nylon is not significantly more effective than 10% nylon in reducing filament breakage; and the larger amount is less preferred, tending to be more detrimental to the flame resistance of the fibers after curing. As indicated by Example 10, mixtures of two or more different aliphatic nylons may be employed, if desired, but no advantage has been found in doing so. As may be seen from Examples 7, 9 and 10, certain types of aliphatic nylons may tend to have a somewhat adverse effect upon one or more mechanical properties of the cured phenolic resin fibers. This is probably due to the susceptibility of certain nylons to hydrolysis under the acid curing conditions employed in the examples, and is not thought to be a factor in heat curing resole fibers or in curing novolac fibers under nonacidic conditions. Nonetheless, novolacs are generally much preferred to resoles for purposes of the invention since it has been found that they lend themselves more conveniently to fiberization and to subsequent curing, the latter step preferably being carried out under acidic conditions. When employing a novolac for melt spinning and curing under acidic conditions, it is usually preferred to employ an aliphatic nylon which does not have any significant adverse effect upon the mechanical properties of the resulting cured phenolic resin fibers, nylon-6,10 being especially preferred in this regard. However, depending upon the intended use for the cured phenolic resin fibers, the improvement in melt spinning characteristics of phenolic resins effected by the aliphatic nylons may be a factor of much greater significance than the mechanical properties of the cured phenolic resin fibers.

Tenacity and break elongation values set forth herein are determined in substantial accordance with A.S.T.M. designation D2101-64T, denier being determined in accordance with A.S.T.M. designation D1577-60T. Percentages set forth herein are by weight except as otherwise stated or indicated by the context as in the case of break elongation values.

While the invention has been described herein with reference to certain examples and preferred embodiments, it is to be understood that various changes and modifications may be made by those skilled in the art without departing from the concept of the invention, the scope of which is to be determined by reference to the following claims.

We claim:

1. A fiber produced by melt spinning and consisting essentially of a homogeneous physical mixture of an uncured phenolic resin and from about 5% to about 30% of an aliphatic nylon, said phenolic resin being a condensation product of a phenol and an aldehyde selected from the group consisting of formaldehyde and paraformaldehyde.

2. A fiber as set forth in claim 1 wherein said phenolic resin is selected from the group consisting of resoles, novolacs, and mixtures thereof.

3. A fiber as set forth in claim 1 wherein said phenolic resin is a novolac.

4. A fiber as set forth in claim 1 wherein said aliphatic nylon is present to the extent of about 10%.

5. A continuous monofilament yarn comprising a plurality of fibers as set forth in claim 1.

6. A fiber as set forth in claim 1 wherein the aliphatic nylon is selected from the group consisting of nylon-6; nylon-7; nylon-8; nylon-9; nylon-10; nylon-11; nylon-12; nylon-4,4; nylon-6,4; nylon-6,6; nylon-6,7; nylon-6,8; nylon-6,9; nylon-6,10; nylon-6,12; nylon-8,10; nylon-8,12; nylon-10,10; nylon-10,12; and mixtures thereof.

7. An infusible cured phenolic resin fiber produced by curing the phenolic resin in a fiber as set forth in claim 1 at least to the point of infusibility.

8. A fiber as set forth in claim 7 wherein the phenolic resin is a novolac.

9. A fiber as set forth in claim 7 wherein the aliphatic nylon is present to the extent of about 10%.

10. A continuous multifilament yarn comprising a plurality of fibers as set forth in claim 7.

11. In a process of producing a fiber by melt spinning an uncured phenolic resin, said phenolic resin being the condensation product of a phenol and an aldehyde selected from the group consisting of formaldehyde and paraformaldehyde, the improvement comprising incorporating in said resin, prior to spinning, from about 5% to about 30% of an aliphatic nylon.

12. A process as set forth in claim 11 wherein the phenolic resin is selected from the group consisting of resoles, novolacs and mixtures thereof.

13. A process as set forth in claim 12 wherein the aliphatic nylon is incorporated in the resin in an amount of about 10%.

14. In a process of producing a fiber by melt spinning an uncured phenolic resin, wherein said phenolic resin is a novolac, the improvement comprising incorporating in said resin, prior to spinning, from about 5% to about 30% of an aliphatic nylon.

15. In a process of producing an infusible cured phenolic resin fiber by melt spinning an uncured phenolic resin to produce a fusible uncured phenolic resin fiber and curing the phenolic resin at least to the point of infusibility, said phenolic resin being the condensation product of a phenol and an aldehyde selected from the group consisting of formaldehyde and paraformaldehyde, the improvement comprising incorporating in said uncured phenolic resin, prior to spinning, from about 5% to about 30% of an aliphatic nylon.

16. A process as set forth in claim 15 wherein the phenolic resin is selected from the group consisting of resoles, novolacs and mixtures thereof.

17. A process as set forth in claim 15, wherein the phenolic resin is a novolac.

18. A process as set forth in claim 15 wherein the aliphatic nylon is incorporated in the uncured phenolic resin in an amount of about 10%.

* * * * *